United States Patent
Shirokoshi et al.

(10) Patent No.: US 7,293,632 B2
(45) Date of Patent: Nov. 13, 2007

(54) BRAKE-EQUIPPED RETRACTING MECHANISM FOR RETRACTABLE MEMBER

(75) Inventors: Norio Shirokoshi, Nagano-ken (JP); Naomi Shirasawa, Nagano-ken (JP)

(73) Assignee: Harmonic AD, Inc., Nagano-Ken (JP)

( * ) Notice: Subject to any disclaimer, the term of this patent is extended or adjusted under 35 U.S.C. 154(b) by 287 days.

(21) Appl. No.: 11/222,314

(22) Filed: Sep. 8, 2005

(65) Prior Publication Data
US 2006/0060439 A1    Mar. 23, 2006

(30) Foreign Application Priority Data
Sep. 22, 2004    (JP)    ............... 2004-274724

(51) Int. Cl.
*F16D 51/00*    (2006.01)
(52) U.S. Cl. ............... 188/77 W; 188/188; 188/65.1
(58) Field of Classification Search ............... 188/65.1, 188/65.2, 65.4, 166, 188, 77 R, 77 W
See application file for complete search history.

(56) References Cited

U.S. PATENT DOCUMENTS

| | | | | |
|---|---|---|---|---|
| 3,776,331 A | * | 12/1973 | Gustafsson | ............... 188/166 |
| 3,795,985 A | * | 3/1974 | Hasebe et al. | ............... 34/58 |
| 4,420,885 A | * | 12/1983 | Todero | ............... 30/381 |
| 4,753,012 A | * | 6/1988 | Schurr | ............... 30/382 |
| 4,809,078 A | * | 2/1989 | Yabe et al. | ............... 348/794 |
| 5,096,271 A | * | 3/1992 | Portman | ............... 312/7.2 |
| 5,467,106 A | | 11/1995 | Salomon | |
| 5,480,009 A | * | 1/1996 | Wieland et al. | ............... 188/77 W |
| 5,743,487 A | * | 4/1998 | Rice | ............... 244/1 R |
| 5,813,123 A | * | 9/1998 | Wieland et al. | ............... 30/382 |
| 6,256,078 B1 | | 7/2001 | Ogata | |
| 6,424,386 B1 | | 7/2002 | Shimizu | |

FOREIGN PATENT DOCUMENTS

DE    42 12 292 A1    10/1993

* cited by examiner

*Primary Examiner*—Devon Kramer
(74) *Attorney, Agent, or Firm*—Flynn, Thiel, Boutell & Tanis, P.C.

(57) ABSTRACT

In a brake-equipped retracting mechanism, rotational force of a motor is used to open a liquid crystal display device from a retracted position to an open position, a power spring is wound up in conjunction with this opening operation, and elastic restoring force thereof is used to return the liquid crystal display device from the open position to the retracted position. A rope for developing a greater or smaller tensile force in conjunction with opening and closing of the liquid crystal display device is wound around a slip clutch linked to a reducer input shaft, whereby braking force for preventing the liquid crystal display device from an abrupt return is applied to the reducer input shaft. The braking force gradually decreases as the liquid crystal display device returns to the retracted position, and the liquid crystal display device can therefore be returned at a substantially constant speed.

8 Claims, 6 Drawing Sheets

(ARROW A-A)

(a)

(b)

BRAKE-EQUIPPED RETRACTING MECHANISM FOR RETRACTABLE MEMBER

BACKGROUND OF THE INVENTION

1. Field of the Invention

The present invention relates to a brake-equipped retracting mechanism whereby a retractable member such as a liquid crystal display device installed in the ceiling of a passenger cabin of an aircraft or the like is swung between a retracted position and an open position.

2. Description of the Related Art

Liquid crystal display devices are installed in ceilings of passenger cabins in aircrafts or the like, and these devices are retracted horizontally in the ceiling and are opened to a substantially vertical open position when necessary. When the liquid crystal display device opens, rotational motion outputted via a motor and a reducer is converted to pivoting movement for opening the liquid crystal display device to the open position via a link mechanism. A power spring is linked to an input or output shaft of the reducer, and the power spring is designed to be wound up in conjunction with the opening movement of the liquid crystal display device. When the liquid crystal display device is retracted, the motor and reducer are disconnected by an electromagnetic clutch, and the liquid crystal display device is returned to the retracted position by restoring force of the wound-up power spring. The reason that the retracting operation should not be dependent on rotational force of the motor is because of a requirement for the liquid crystal display device to be reliably returned to a safe retracted position without relying on an electric force during emergencies.

As shown in FIG. 5(b), a liquid crystal display device 1 is substantially horizontal position in a retracted position 1A, and is substantially vertical position in an open position 1B. Therefore, as shown in FIG. 5(a), a torque T(1) that is generated by the own weight of the liquid crystal display device 1 and urges the device to pivot in an opening direction is greatest in the retracted position, decreases as the device pivots to the open position 1B, and reaches a minimum at the vertical position. By contrast, restoring force T(18) of the power spring is lowest when the liquid crystal display device 1 is retracted because the power spring is wound the lowest number of times (initial winding state), and the restoring force T(18) is at a maximum when the liquid crystal display device 1 reaches the open position 1B, because the number of windings is at a maximum. In order to return the liquid crystal display device 1 to the retracted position 1A with the aid of the power spring, the restoring force T(18) in the initial winding state must exceed the torque T(1) in the opening direction due to the own weight of the liquid crystal display device 1 in the retracted position.

If restoring force of the power spring is set in this manner, the torque reaches a maximum in the open position and a return torque T(1+18) is applied, which decreases toward the retracted position. The return torque in the open position is extremely strong, which is dangerous because it causes an abrupt closure of the liquid crystal display device 1. In view of this, a retracting mechanism of the liquid crystal display device 1 is provided with a brake mechanism for applying a brake so that the liquid crystal display device closes at an appropriate speed. Conventionally, a gear damper, which increases braking force in proportion to the speed, is used.

However, the gear damper is configured so that multiple gears are provided and frictional force is enhanced by centrifugal force, which leads to problems with complicated mechanisms and poor reliability.

SUMMARY OF THE INVENTION

A main object of the present invention is to provide a brake-equipped retracting mechanism for a retractable member such as a liquid crystal display device or the like that has a reliable and inexpensive brake mechanism with a simple structure.

In order to solve the problems described above, a brake-equipped retracting mechanism for a retractable member of the present invention has:

a retractable member that is opened from a retracted position to an open position by rotational force of a motor;

a return-spring member that undergoes greater elastic deformation in conjunction with the opening operation of the retractable member, and that returns the retractable member from the open position to the retracted position by an elastic restoring force created by the elastic deformation;

a rotational member for transmitting the rotational force of the motor and the elastic restoring force of the return-spring member to the side of the retractable member; and a string member wound around the rotational member for restraining the rotation of the rotational member; wherein a tensile force of the string member increases in conjunction with the opening operation of the retractable member so that rotation-restraining force acting on the rotational member is increased, while it decreases in conjunction with the closing operation of the retractable member so that the rotation-restraining force is decreased.

The rotational movement of the rotational member can be transmitted to the side of the retractable member via a link member capable of pivoting around the rotational member between a rotational position corresponding to the retracted position and a rotational position corresponding to the open position. In this case, in order to increase the tensile force of the string member in conjunction with the opening operation of the retractable member, one end of the string member may be fixed in place either directly or via a braking spring member, and the other end of the string member may be linked to the link member either directly or via the braking spring member. When the string member is pulled as the link member pivots, the amount of elastic deformation of the braking spring member increases, the tensile force acting on the string member also increases, and the rotation-restraining force on the rotational member increases as well. Specifically, braking force increases. Conversely, when the string member is slackened, the amount of elastic deformation of the braking spring member decreases, the tensile force acting on the string member also decreases, and the rotation-restraining force (braking force) on the rotational member decreases as well.

Instead of linking the braking spring member to the end of the string member, it is possible to wind a middle section of the string member around a brake drum to which the rotation-restraining force is applied by the braking spring member.

Also, part of the string member may be wound around a tension adjusting drum in order to adjust the tensile force applied to the rotational member by the braking spring member or to adjust the amount of tension or amount of slack in the string member resulting from the pivoting of the link member.

Next, a metal wire may be used as the string member, but it is preferable to use a rope made of a fluororesin with excellent durability and abrasion resistance.

Also, impregnating the string member with grease has advantages in that a specific braking force can be ensured by viscosity of the grease when the string member is slackened, variation in the tensile force of the string member over time can be reduced, and the tensile force of the string member can be easily adjusted.

A typical retracting mechanism of the present invention is configured so that the rotational force of the motor is transmitted to the rotational member via an electromagnetic clutch, and the electromagnetic clutch is cut off when the retractable member is returned to the retracted position. In a more preferred embodiment, a configuration is used in which the rotational force of the motor is transmitted to the link member via a one-way clutch for return prevention, the electromagnetic clutch, a slip clutch for overload prevention, and a reducer, and the string member is wound around an input shaft of the reducer.

The brake-equipped retracting mechanism according to the present invention is designed so that a string member is wound around the rotational member for transmitting the rotational force of the motor, and the tensile force of this string member is increased or reduced in conjunction with the movement of the retractable member. Therefore, it is possible to provide a retracting mechanism that is equipped with an extremely simple, reliable, and inexpensive brake mechanism, compared with a mechanism in which a gear damper is used to create braking force when the retractable member is stowed away.

BRIEF DESCRIPTION OF THE DRAWINGS

FIG. 6 is a diagram showing the main section of a brake mechanism according to the present invention, wherein FIG. 6(a) is a schematic block diagram of a cross section along the center axis line, FIG. 6(b) is a cross-sectional view as seen from the direction of the arrow A, and FIG. 6(c) is an explanatory diagram of the brake mechanism.

DESCRIPTION OF THE PREFERRED EMBODIMENTS

Hereinbelow, a brake-equipped retracting mechanism for a liquid crystal display device installed in the ceiling of a passenger cabin in an aircraft according to the present invention will be described with reference to the drawings.

(Overall Configuration)

Figure 1:
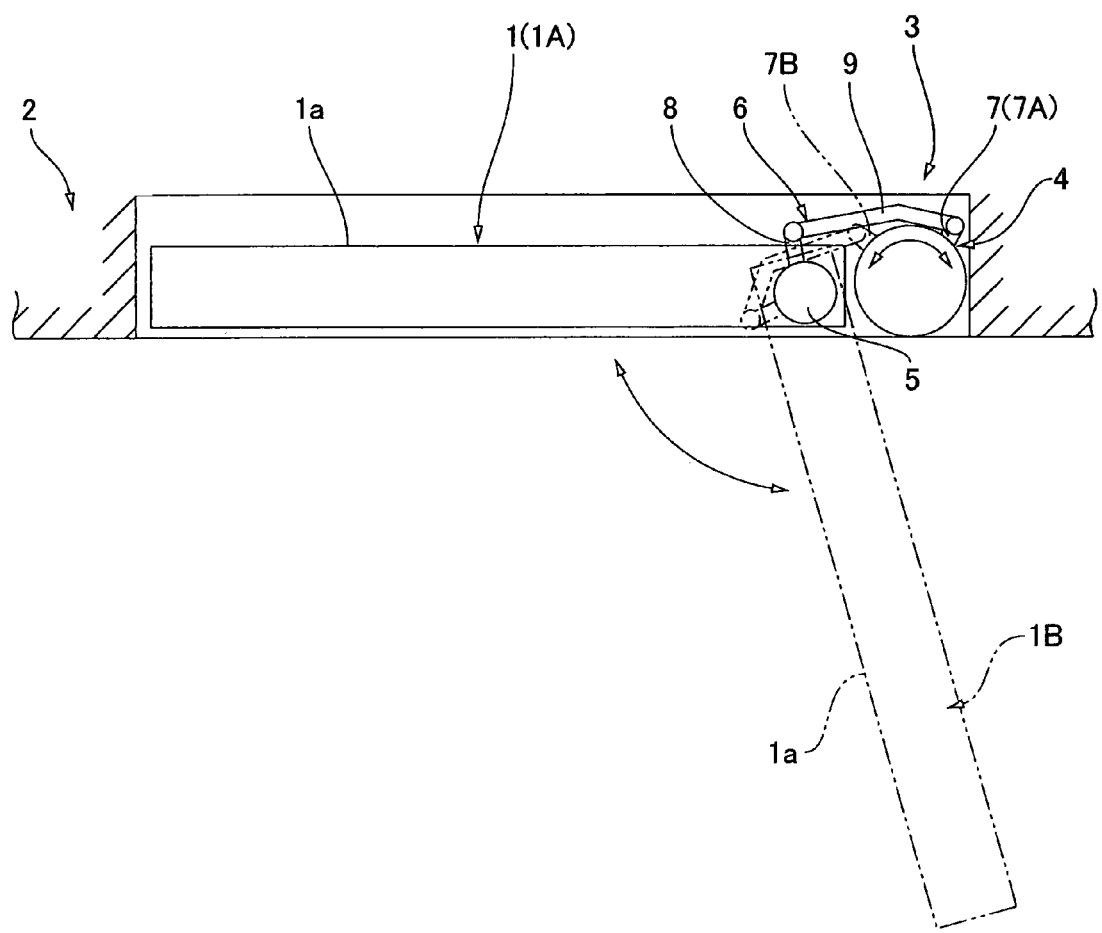
FIG. 1 is a general block diagram showing a brake-equipped retracting mechanism for a liquid crystal display device according to the present invention.

FIG. 1 is a general block diagram showing a brake-equipped retracting mechanism for a liquid crystal display device. A liquid crystal display device 1 is capable of pivoting from a horizontal retracted position 1A in a ceiling 2 of a passenger cabin in an aircraft, as shown by the solid line, to an open position 1B that is open downward by an angle of about 105 degrees, as shown by the imaginary line. A brake-equipped retracting mechanism 3 for the liquid crystal display device 1 includes a main section 4, and a link mechanism 6 for converting rotational movement exerted from the main section 4 into opening and closing movement (pivoting movement) of the liquid crystal display device 1 around a pivot center shaft 5. The link mechanism 6 includes, for example, a driving-side link 7 that is linked to a side of the main section 4, a driven-side link 8 that is linked to a side of the pivot center shaft 5 of the liquid crystal display device 1, and an intermediate link 9 that links the links 7, 8 together and that bends at a slight angle. The liquid crystal display device 1 stays at the retracted position 1A when the driving-side link 7 is in a first position 7A shown by the solid line, and the liquid crystal display device 1 reaches the open position 1B when the link pivots from the first position to a second position 7B shown by the imaginary line. When the liquid crystal display device 1 reaches the open position 1B, a screen 1a can be seen from a passenger seat.

Figure 2:
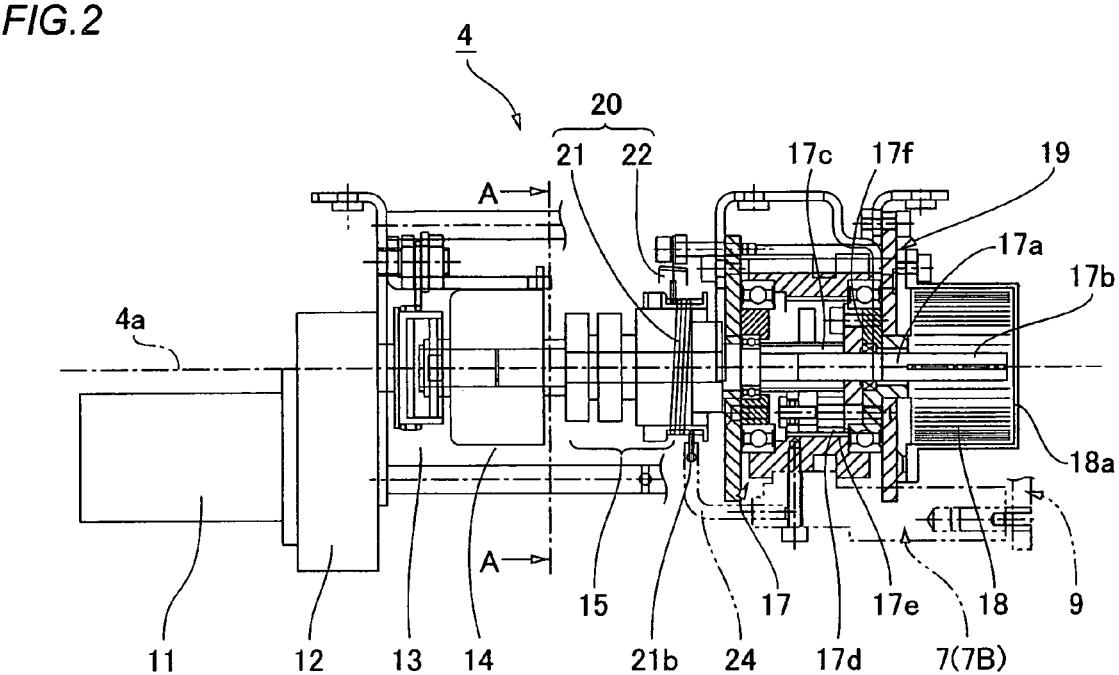
FIG. 2 is a diagram showing the main section of the brake-equipped retracting mechanism in FIG. 1, and is a schematic block diagram of a cross section along the center axis line.
Figure 3:
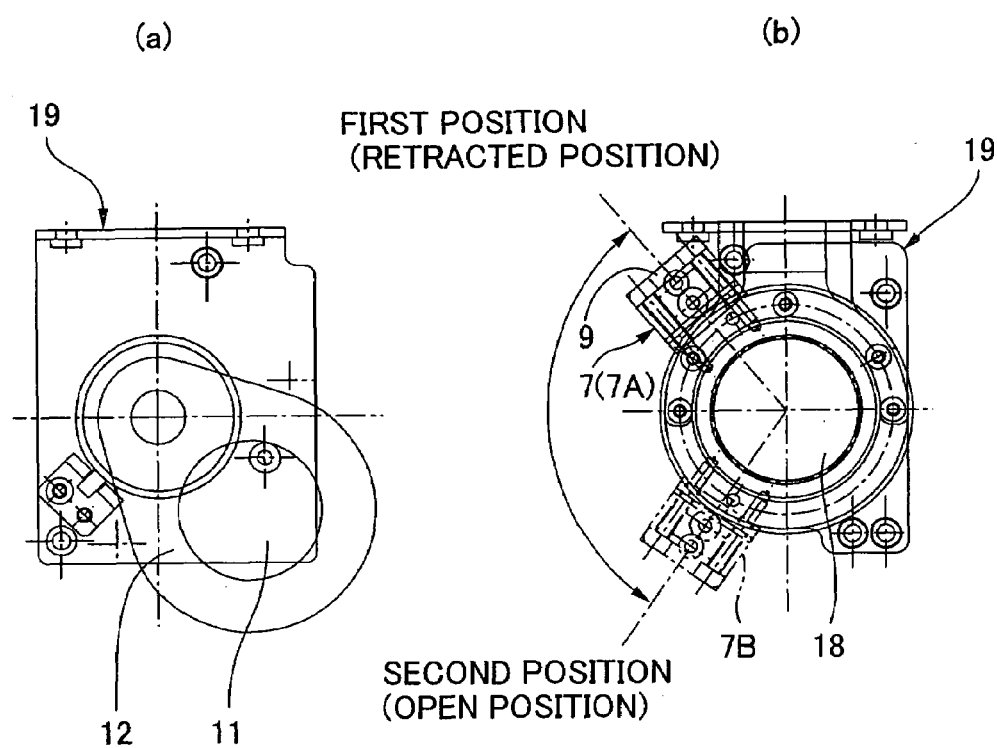
FIG. 3(a) is an end view showing a rear end of the main section of the mechanism.
FIG. 3(b) is an end view showing a front end thereof.
Figure 4:
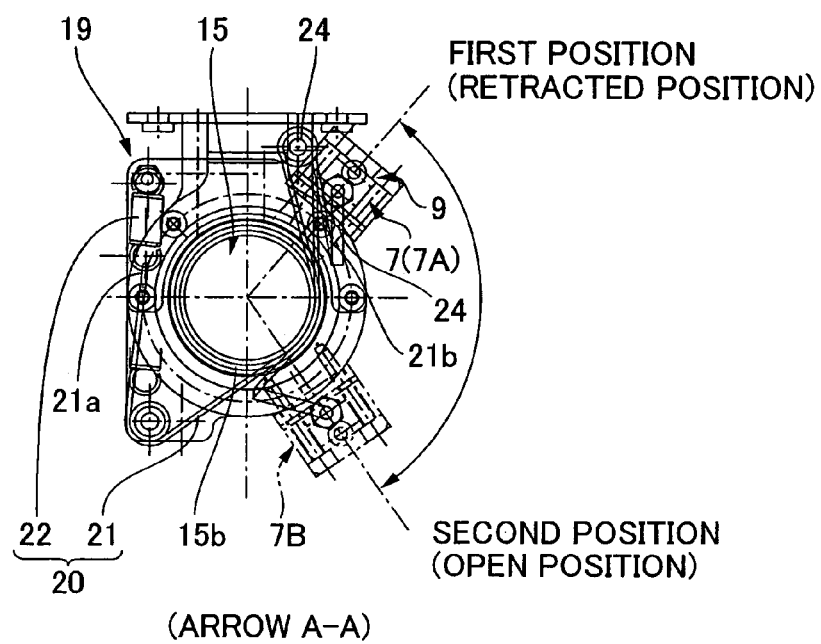
FIG. 4 is a cross-sectional view as seen from the direction of an arrow A in FIG. 2.

FIG. 2 is a diagram showing the main section 4 of the brake-equipped retracting mechanism 3, and is a schematic block diagram of a cross section along a center axis line. FIG. 3(a) is an end view showing a rear end of the main section 4, FIG. 3(b) is an end view showing a front end thereof, and FIG. 4 is a cross-sectional view as seen from the direction of the arrow A in FIG. 2.

With reference to these drawings, the main section 4 includes a motor 11 on the rear side, and rotation of the motor 11 is transmitted via a reduction gear train 12 to an input side of a one-way clutch 13 coaxially aligned with a center axis line 4a of the mechanism. The one-way clutch 13, an electromagnetic clutch 14, and a slip clutch 15 are aligned in this order coaxially with the center axis line 4a of the mechanism from the rear side to the front side. An output side of the slip clutch 15 is linked to the rear side of an input shaft 17a (rotational member) of a coaxially aligned planetary gear reducer 17. A distal end 17b of the input shaft 17a protrudes by a prescribed length from an end face on a distal end side of the planetary gear reducer 17, and an inner end of a power spring 18 wound around the distal end 17b in a spiral is linked thereto. An outer end of the power spring 18 is fixed to a cup-shaped casing 18a that is fixed to a side of a mechanism frame 19.

The planetary gear reducer 17 includes a sun gear 17c fixed coaxially with the input shaft 17a, an internal gear 17d that concentrically surrounds the sun gear 17c, and a plurality of planetary gears 17e that are disposed between the sun gear and the internal gear and that mesh with both of the gears. The planetary gears 17e are rotatably supported by a planetary carrier 17f. The planetary carrier 17f is fixed on the mechanism frame 19, and the internal gear 17d is rotatably supported by a pair of front and rear ball bearings. The internal gear 17d rotates in the opposite direction of the input shaft 17a and outputs reduced-speed rotation. The driving-side link 7 of the link mechanism 6 is fixed to an outer peripheral surface of the internal gear 17d. The driving-side link 7 extends parallel to the center axis line 4a of the mechanism toward the distal end side, and one end of the intermediate link 9 is linked to the distal end thereof.

When the driving-side link 7 is at the first position 7A shown by the solid line, the liquid crystal display device 1 is in the retracted position 1A, and when the link reaches the second position 7B shown by the imaginary line, the liquid crystal display device 1 reaches the open position 1B. Specifically, when the motor 11 is driven while the liquid crystal display device 1 is in the retracted position 1A, rotational force thereof is transmitted to the input shaft 17a of the planetary gear reducer 17, and its output element, namely the internal gear 17d, rotates at a reduced speed. The rotational movement is converted to pivotal movement of the liquid crystal display device 1 via the link mechanism 6, and the liquid crystal display device 1 begins to open toward the open position 1B. Also, the power spring 18 is wound by the rotation of the input shaft 17a. When the liquid crystal display device 1 reaches the open position 1B, the motor 11 stops and the liquid crystal display device 1 is held at the open position 1B. Here, the one-way clutch 13 is disposed so as to prevent a return, and the slip clutch 15 is disposed so as to prevent an overload.

When the liquid crystal display device 1 in the open position 1B is closed (retracted), the electromagnetic clutch 14 is cut off and the link between the motor 11 and the gear reducer 17 is severed. Since the input shaft 17a of the gear reducer 17 is linked to the power spring 18, reverse rotation is started by elastic restoring force of the power spring 18 that is wound up when the liquid crystal display device 1 is open. As a result, the internal gear 17d of the reducer 17 rotates at a reduced speed in the opposite direction, and the driving-side link 7 mounted thereon pivots toward the first position 7A. The liquid crystal display device 1 therefore gradually closes toward the retracted position 1A. After the liquid crystal display device 1 has returned to the retracted position 1A, the liquid crystal display device 1 is held at that position by elastic force of the power spring 18.

(Brake Mechanism)

As was described with reference to FIG. 5(a), the torque T(1) that urges the liquid crystal display device 1 to rotate in the open direction (opening direction) due to the own weight of the liquid crystal display device 1 is at a maximum when the device is in a horizontal position in the retracted state, the torque reaches zero when the device is in the vertical position (pivoted by 90 degrees) before reaching the open position 1B, and a small torque in the opposite direction is created when the device is at the open position 1B. A return torque needed to return the liquid crystal display device 1 from the open position to the retracted position against the torque T(1) due to the own weight of the device ideally increases toward the retracted position 1A and reaches a maximum at the retracted position 1A, in which case the liquid crystal display device 1 can be returned to the retracted position 1A by a substantially constant torque.

The return torque T(18) from the power spring 18 reaches a maximum at the open position 1B, gradually decreases toward the retracted position 1A, and reaches a minimum at the retracted position 1A. A combined return torque T(1+18) from the own weight and the power spring becomes extremely strong at the open position 1B. This is undesirable because the liquid crystal display device 1 ends up pivoting abruptly from the open position to the retracted position when the liquid crystal display device 1 is closed.

The retracting mechanism 3 includes a brake mechanism 20 for applying a brake to the pivoting, and the brake mechanism 20 of the present example includes a rope 21 made of a fluororesin commonly referred to as Teflon (product name), and a braking coil spring 22. As can be seen from FIG. 4, a rear end 21a of the rope 21 is linked to the braking coil spring 22, one end of which is linked to the mechanism frame 19. The rope 21 is pulled out from this position in a stretching direction of the braking coil spring 22 and is placed over a rope stand 23 mounted on the mechanism frame 19, after which the rope is wound several times around an outer peripheral surface 15b of a cylindrical casing of the slip clutch 15 to which the input shaft 17a is linked. Furthermore, the rope is pulled out from the outer peripheral surface 15b, placed over the rope stand 23, and then pulled out in the opposite direction. A distal end 21b thereof is linked to a distal end of a linking bar 24 fixed to the driving-side link 7.

When the driving-side link 7 is in the first position (when the liquid crystal display device 1 is in the retracted position 1A), the rope 21 is the most loose, and therefore the braking coil spring 22 is the most constricted. When the driving-side link 7 pivots toward the second position, the rope 21 is pulled along with the pivoting, the braking coil spring 22 gradually elongates, and tensile force of the rope 21 increases. As a result, the rotation-restraining force (braking force) increases on a cylindrical casing 15a of the slip clutch 15 around which the rope 21 is wound.

Figure 5:
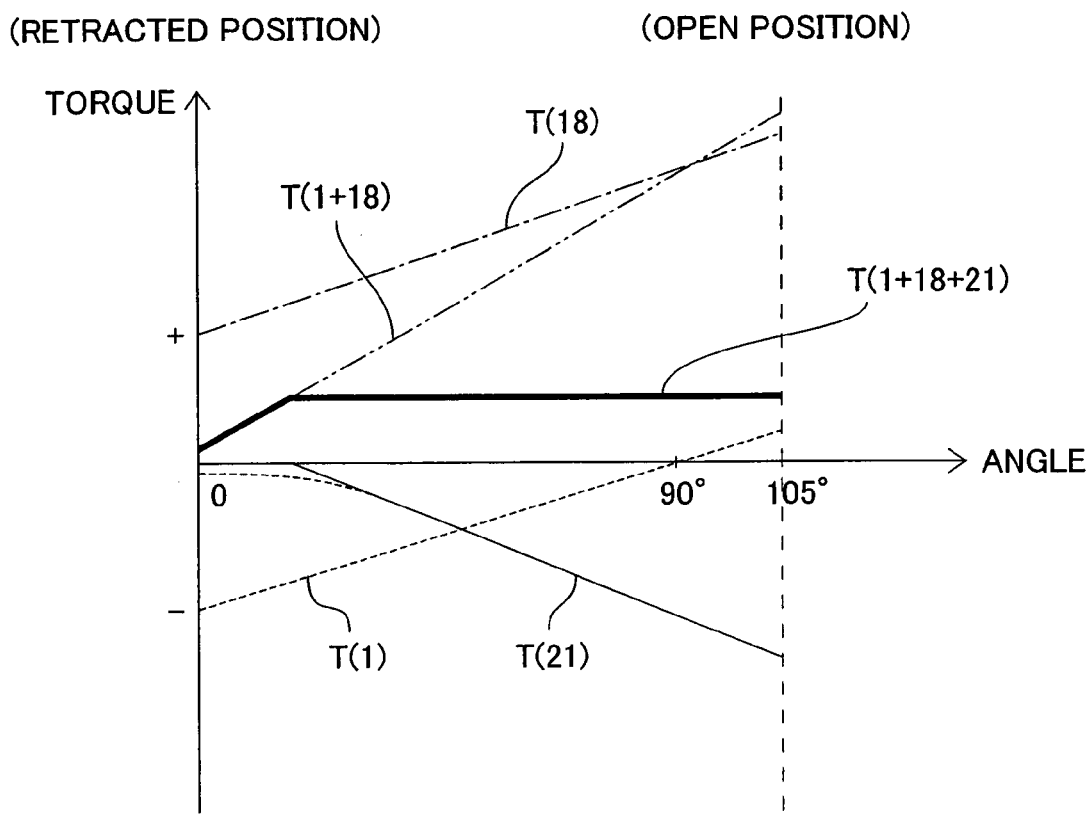
FIG. 5 is a graph for describing the torque that acts on the liquid crystal display device.
Figure 5:
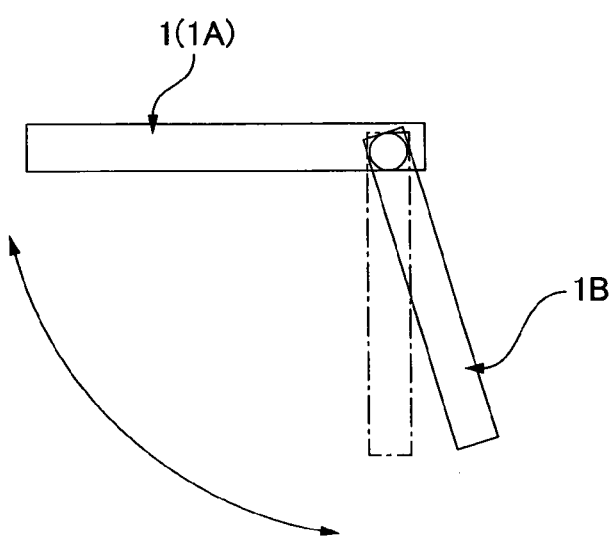

The braking force on the slip clutch 15 from the rope 21 reaches a maximum when the driving-side link 7 has reached the second position (when the liquid crystal display device 1 has reached the open position 1B), as shown by a curve T(21) in FIG. 5(a). Therefore, when the liquid crystal display device 1 returns to the retracted position 1A from the open position 1B, a strong braking force acts on the reducer input shaft 17a from the slip clutch 15. The braking force is thereby applied to the reducer input shaft 17a rotated by the elastic restoring force of the power spring 18, and a rotational speed thereof is reduced. Specifically, a substantially constant torque is applied as a return torque, as shown by the curve T(1+18+21) in FIG. 5(a), and the liquid crystal display device 1 pivots from the open position toward the retracted position at a substantially constant speed.

Specifically, the elastic restoring force T(18) of the power spring 18 decreases as the liquid crystal display device 1 nears the retracted position 1A because the power spring is gradually wound back up. Accordingly, the tension on the rope 21 is gradually relaxed as the liquid crystal display device 1 nears the retracted position 1A, and therefore the braking force T(21) resulting from the tensile force of the rope 21 gradually decreases as well. Accordingly, when the liquid crystal display device 1 is retracted, the device returns to the retracted position 1A at a substantially constant speed because a substantially equal return torque T(1+18+21) is applied.

Thus, in the brake-equipped retracting mechanism 3 of the liquid crystal display device of the present example, the rope 21 pulled by the coil spring 22 is wound around the slip clutch 15 linked to the reducer input shaft 17a, a maximum braking force is applied to the reducer input shaft 17a when the liquid crystal display device 1 is in the open position, and the rope 21 is loosened as the device moves from the open position to the retracted position to reduce the braking force. Therefore, it is possible to provide a highly reliable retracting mechanism because a predetermined braking force can be reliably applied with an extremely simple and inexpensive configuration.

(Another Example of a Brake Mechanism)

Figure 6:
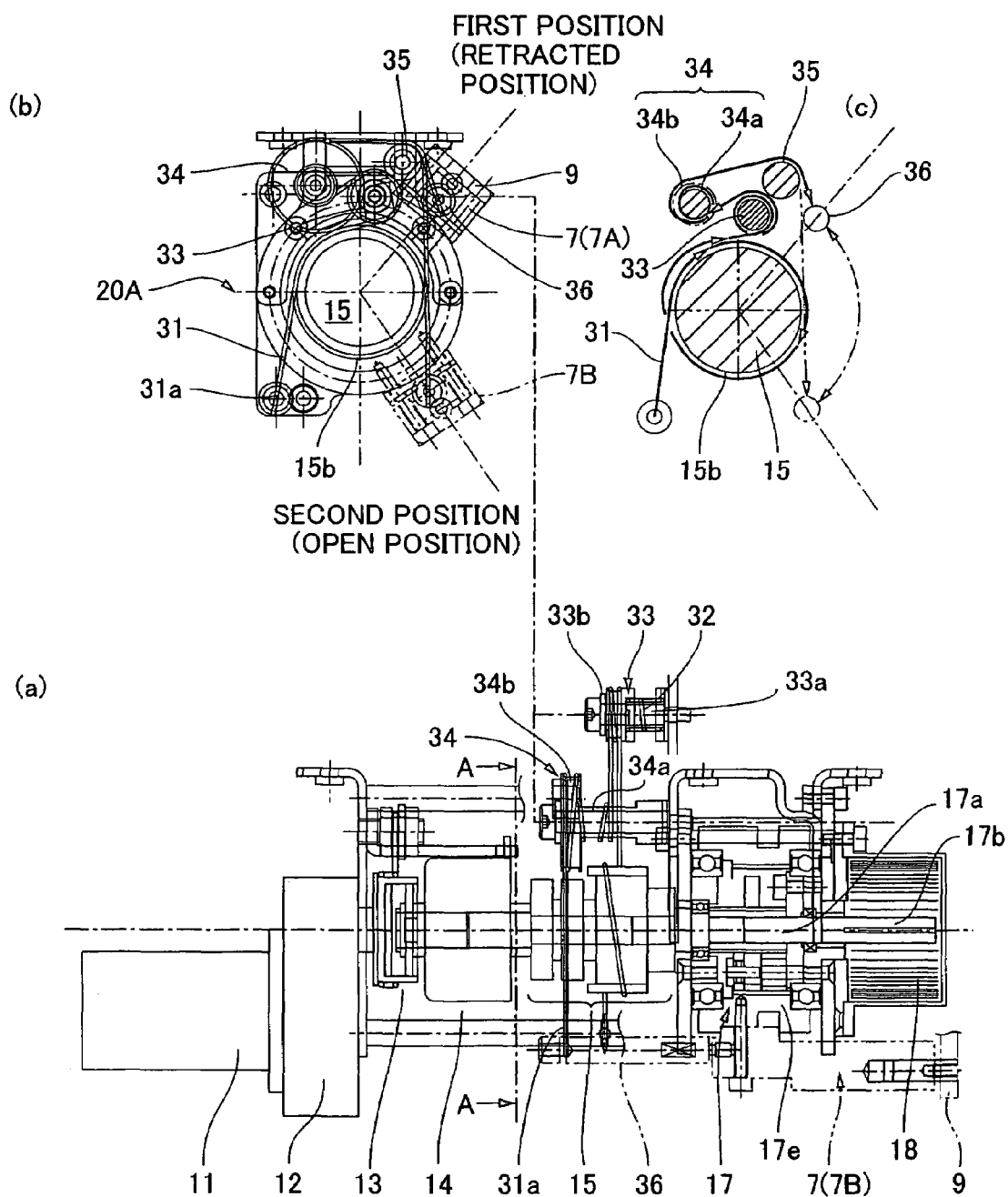

Next, another example of a brake mechanism that can be mounted in the brake-equipped retracting mechanism 3 will be described. FIG. 6 is a diagram showing a mechanism main section 4A including a brake mechanism 20A, wherein FIG. 6(a) is a schematic block diagram of a cross section along a center axis line 4a, FIG. 6(b) is a cross-sectional view as seen from the direction of an arrow A, and FIG. 6(c) is an explanatory diagram of the brake mechanism. The basic configuration of the mechanism main section 4A is identical to the mechanism main section 4 previously described, and therefore the corresponding components are denoted by the same numerals, and descriptions thereof are omitted.

The brake mechanism 20A of the mechanism main section 4A of the present example includes a Teflon rope 31, a brake adjusting drum 33 equipped with a braking coil spring 32, and a tension adjusting drum 34. As can be seen from FIG. 6, a rear end 31a of the rope 31 is fixed to the mechanism frame 19, from where it is pulled out to be wound around the outer peripheral surface 15b of the cylindrical casing of the slip clutch 15 one or more times, and is then wound multiple times around the brake adjusting drum 33. The rope is then pulled out from this position, wound around a small drum part 34a and a large drum part 34b in the tension adjusting drum 34, thereafter placed over a rope stand 35, and linked to a linking bar 36 of the driving-side link 7.

The brake adjusting drum 33 includes a support axle 33a fixed to the mechanism frame 19, and a drum main body 33b rotatably supported on a distal end of the support axle 33a. The drum main body 33b is fixed to a distal end of the braking coil spring 32 disposed around the support axle 33a. A rear end of the braking coil spring 32 is fixed to the support axle 33a or the mechanism frame 19.

When the driving-side link 7 pivots from the first position 7A to the second position 7B, the rope 31 is pulled along with the pivoting. As a result, the section wound around the tension adjusting drum 34 is unwound, the braking coil spring 32 is wound accordingly, and tensile force of the rope 31 therefore increases. At the point that the driving-side link 7 reaches the second position 7B, the tensile force acting on the rope 31 reaches a maximum, and therefore the braking force (rotation-restraining force) acting on the reducer input shaft 17a via the slip clutch 15 around which the rope is wound also reaches a maximum. When the driving-side link 7 begins to return from the second position 7B to the first position, the rope 31 is slackened, the braking coil spring 32 is wound back accordingly, and the tensile force acting on the rope 31 decreases. As a result, the braking force acting on the reducer input shaft 17a also decreases.

Therefore, the brake mechanism 20A of the present example can function in the same manner as the brake mechanism 20 of the mechanism main section 4 previously described, and the liquid crystal display device 1 can be returned from the open position 1B to the retracted position 1A at a substantially identical speed.

Also, in the brake mechanism 20A of the present example, a middle section of the rope 31 is wound around the tension adjusting drum 34. Varying the size of the large drum part 34b and the like of the tension adjusting drum 34 makes it possible to adjust the amount of tension, the amount of slack, and the tensile force of the rope 31 that accompanies the pivoting of the driving-side link 7. Accordingly, the braking force can be easily adjusted.

Other Embodiments

The present invention can also be applied to a brake-equipped retracting mechanism for opening a retractable member of a device other than a liquid crystal display device installed in the ceiling of a passenger cabin.

A Teflon rope was used as the rope for creating braking force in the example above, but it is also possible to use a rope, cord, wire, or other string members made from a different material.

Also, when a string member made from Teflon or another material is used, impregnating it with grease is advantageous in that a prescribed braking force can be ensured by viscosity of the grease when the string member is slackened, variation in the tensile force of the string member over time can be reduced, and the tensile force of the string member can be easily adjusted.

The following effects can also be obtained in the example above when a one-way switch is disposed concentrically on the slip clutch 15. Specifically, the load on the motor from the braking force when the liquid crystal display device 1 is open can be reduced, and slackening resulting from paying-out of the rope for creating braking force can be prevented.

The invention claimed is:

1. A brake-equipped retracting mechanism for a retractable member, having:
   a retractable member that is opened from a retracted position to an open position by a rotational force of a motor;
   a return spring member that undergoes greater elastic deformation in conjunction with an opening operation of the retractable member and returns the retractable member from the open position to the retracted position by an elastic restoring force created by the elastic deformation;
   a rotational member for transmitting the rotational force of the motor and the elastic restoring force of the return spring member to a side of the retractable member; and
   a string member wound around the rotational member for restraining the rotation of the rotational member; wherein
   a tensile force of the string member increases in conjunction with the opening operation of the retractable member so that rotation-restraining force acting on the rotational member is increased, while it decreases in conjunction with a closing operation of the retractable member so that the rotation-restraining force is decreased.

2. The brake-equipped retracting mechanism for a retractable member according to claim 1, having:
   a link member capable of pivoting around the rotational member between a rotational position corresponding to the retracted position and a rotational position corresponding to the open position in order to transmit the rotational movement of the rotational member to the retractable member; wherein
   the string member has one end that is fixed either directly or via a spring member, and the other end that is linked to the link member either directly or via a spring member.

3. The brake-equipped retracting mechanism for a retractable member according to claim 1, having:
   a link member capable of pivoting around the rotational member between a rotational position corresponding to the retracted position and a rotational position corresponding to the open position in order to transmit the rotational movement of the rotational member to the retractable member; and
   a braking drum to which rotation-restraining force is applied by a spring member; wherein
   the string member has one end fixed in place, the other end linked to the link member, and a part wound around the braking drum.

4. The brake-equipped retracting mechanism for a retractable member according to claim 2, having:
   a tension adjusting drum around which part of the string member is wound in order to adjust the tensile force applied to the string member.

5. The brake-equipped retracting mechanism for a retractable member according to claim 1, wherein
the string member is made of a fluororesin.

6. The brake-equipped retracting mechanism for a retractable member according to claim 1, wherein
the string member is impregnated with grease.

7. The brake-equipped retracting mechanism for a retractable member according to claim 2, further having:
an electromagnetic clutch for cutting off a transmission of the rotational force of a motor to the rotational member.

8. The brake-equipped retracting mechanism for a retractable member according to claim 7, having:
a one-way clutch for return prevention, a slip clutch for overload prevention, and a reducer so that the rotational force of a motor is transmitted to the link member via the one-way clutch for return prevention, the electromagnetic clutch, the slip clutch for overload prevention, and the reducer; wherein
the string member is wound around an input shaft of the reducer.

* * * * *